United States Patent
Hall et al.

(10) Patent No.: US 8,361,655 B2
(45) Date of Patent: Jan. 29, 2013

(54) BATTERY ZINC ELECTRODE COMPOSITION

(75) Inventors: Simon Berners Hall, Palmerston North (NZ); Jinrong Liu, Palmerston North (NZ)

(73) Assignee: Anzode, Inc., Petaluma, CA (US)

( * ) Notice: Subject to any disclaimer, the term of this patent is extended or adjusted under 35 U.S.C. 154(b) by 0 days.

(21) Appl. No.: 12/923,425

(22) Filed: Sep. 21, 2010

(65) Prior Publication Data

US 2011/0012055 A1 Jan. 20, 2011

Related U.S. Application Data (60) Division of application No. 10/662,785, filed on Sep. 15, 2003, now Pat. No. 7,811,704, which is a continuation-in-part of application No. PCT/NZ02/00036, filed on Mar. 15, 2002.

(30) Foreign Application Priority Data

Mar. 15, 2001 (NZ) ........................................ 510554

(51) Int. Cl.
*H01M 4/42* (2006.01)
*H01M 10/24* (2006.01)
(52) U.S. Cl. ...................... 429/229; 429/231; 252/519.5
(58) Field of Classification Search .................. 429/209, 429/212–218.1, 226, 227, 229, 231, 231.9; 29/623.1–623.5; 252/519.5
See application file for complete search history.

(56) References Cited

U.S. PATENT DOCUMENTS

| | | | |
|---|---|---|---|
| 4,074,028 A | 2/1978 | Will | |
| 4,086,392 A | 4/1978 | Mao et al. | |
| 4,146,685 A * | 3/1979 | Tucholski | 429/206 |
| 4,297,249 A * | 10/1981 | Przybyla et al. | 252/62.3 R |
| 4,407,913 A | 10/1983 | Rampel | |
| 4,492,744 A * | 1/1985 | Brown et al. | 429/217 |
| 5,424,145 A | 6/1995 | Tomantschger et al. | |
| 5,626,988 A | 5/1997 | Daniel-Ivad et al. | |
| 5,688,616 A | 11/1997 | Yamawaki et al. | |
| 5,824,434 A | 10/1998 | Kawakami et al. | |
| 5,827,494 A * | 10/1998 | Yano et al. | 423/594.4 |
| 6,391,492 B1 | 5/2002 | Kawakami et al. | |

FOREIGN PATENT DOCUMENTS

| | | |
|---|---|---|
| FR | 2 683 949 | 5/1993 |
| JP | 61118968 | 6/1986 |
| JP | 02135666 | 5/1990 |
| JP | 03071559 | 3/1991 |
| JP | 05174826 | 7/1993 |
| JP | 07161375 | 12/1993 |
| JP | 06203819 | 7/1994 |
| JP | 70-65854 | 3/1995 |
| JP | 07161376 | 6/1995 |
| JP | 09298060 | 11/1997 |
| JP | 09298060 A * | 11/1997 |
| JP | 10021956 | 1/1998 |
| JP | 10 083810 | 3/1998 |
| JP | 11026013 | 1/1999 |
| RU | 2 079 186 | 5/1997 |

* cited by examiner

*Primary Examiner* — Keith Walker
(74) *Attorney, Agent, or Firm* — Nixon & Vanderhye (57) ABSTRACT

A composition, method of its preparation, and zinc electrodes comprising the composition as the active mass, for use in rechargeable electrochemical cells with enhanced cycle life is described. The electrode active mass comprises a source of electrochemically active zinc and at least one fatty acid or a salt, ester or derivative thereof, or an alkyl sulfonic acid or a salt ester or derivative thereof. The zinc electrode is assumed to exhibit low shape change and decreased dendrite formation compared to known zinc electrodes, resulting in electrochemical cells which have improved capacity retention over a number of charge/discharge cycles.

16 Claims, 3 Drawing Sheets

BATTERY ZINC ELECTRODE COMPOSITION

CROSS REFERENCE TO RELATED APPLICATION

This application is a divisional of application Ser. No. 10/662,785 filed Sep. 15, 2003, now U.S. Pat. No. 7,811,704, which is a 371 of PCT/NZ02/00036 filed Mar. 15, 2002, which claims priority to New Zealand Application No. 510554 filed Mar. 15, 2001, the entire contents of each of which are hereby incorporated by reference.

FIELD OF THE INVENTION

The present invention relates to compositions, zinc electrodes, batteries and their methods of manufacture. In particular, it relates to rechargeable zinc cells incorporating such electrodes as anodes.

BACKGROUND OF THE INVENTION

The potential utilization of zinc electrodes in rechargeable alkaline electrochemical cells, in particular nickel-zinc batteries, has long been realised [1]. Nickel-zinc batteries have been demonstrated to have good performance criteria, including:
i) energy density of 55-85 Wh/kg,
ii) power density of 140-200 W/kg,
iii) open circuit potential of 1.75 V, and
iv) a self discharge rate of <0.8%/day.

However, a number of problems associated with the zinc electrode exist that prevent such batteries being charged and discharged for sufficient cycles to be of practical use. These problems arise from the propensity of the zinc electrode to exhibit changes in shape, commonly referred to as 'shape change', upon discharge/charge cycling. Shape change is caused by the solubility of the zinc electrode discharge products in the alkaline electrolyte as the species zincate, $Zn(OH)_4^{2-}$. Eventually, solid zinc hydroxide does precipitate out of solution onto the electrode surface, but this may occur at locations remote from the discharge reaction site. Consequently, upon recharging, the zinc electrode becomes thicker in some locations and thinner in others. This may occur on a gross scale, where electrodes swell or fracture respectively, or may be limited to decreasing the active surface area of zinc metal crystallites on the surface of the zinc electrodes.

In addition to shape change, the phenomenon of zinc dendrite growth also takes place. Dendrite growth occurs when redeposition of zinc metal on recharge takes place at a collection of points on the electrode surface, rather than as an even distribution across the entire surface. The source of zinc material for reduction is not the precipitated zinc hydroxide, but the dissolved zinc in solution. Narrow needles or dendrites of zinc metal grow from the electrode surface and eventually form an internal electrical short to the nickel electrode causing the battery to fail.

A number of different approaches have been attempted to negate or prevent the effects of shape change and dendrite growth. These are, for the most part, focused on decreasing the solubility of the zinc electrode discharge products in the electrolyte. This has been attempted by modifications to the zinc electrode active mass, electrolyte and separators, the latter to prevent growth of dendrites through the separator which otherwise would short the cell. These modifications are summarised in Tables 1-3, below.

TABLE 1

Additives to the active mass showing improved performance

| Additive | Refs. |
|---|---|
| Acetylene black | [2] |
| $Ca(OH)_2$ | [3] |
| CdO | [4] |
| Organic polymers | [5] |
| Zn alloys | [6-8] |
| SnO or $Sn(OH)_2$, PbO or $Pb(OH)_2$ | [9] |
| HgO + organic binder | [10] |
| $Ba(OH)_2$ or $Sr(OH)_2$ | [11] |

TABLE 2

Additives to the electrolyte showing improved performance

| Additive | Refs. |
|---|---|
| ZnO, $(NH_4)_2CS$ | [12] |
| Carbonate salts | [13] |
| $Et_4NBr$ | [14] |
| Alkyl ethers of poly(propyleneglycol) | [15] |
| Mixtures of fatty acids salts, fatty acid esters, aliphatic alcohols & hydrocarbons | [16] |
| Fluoride salts and hydroxides | [17, 18] |

TABLE 3

Additives to the separator showing improved performance

| Additive | Refs. |
|---|---|
| Carboxymethylcellulose | [19] |
| Sucrose fatty acid esters | [20] |
| Sorbitan fatty acid esters | [21] |

Bocharov et al., USSR SU Patent No. 1 457 760 (1992) [16], disclosed an electrolyte for a nickel zinc battery containing $C_{10}$-$C_{16}$ fatty acids as a mixture together with a number of long alkyl chain esters, alcohols and hydrocarbons that exhibited improved performance.

Okabe et al., in two patents described the use of fatty acid esters of sucrose, Jpn. Patent JP No. 07 161 376 [20], and sorbitan, Jpn. Patent JP No. 07 161 375 [21], coated on nickel zinc battery separators to inhibit growth of dendrites through this component. It is most probable that in this strongly alkaline electrolyte, hydrolysis of the fatty acid esters occurs to yield the free fatty acids in the electrolyte.

Whilst these modifications were shown to improve the performance of nickel-zinc batteries at low charge and discharge rates, there is still a need for a rechargeable nickel-zinc battery with demonstrably low shape change together with the absence of dendrite growth at high charge and discharge rates.

It is therefore an object of the present invention to provide a rechargeable zinc electrode and rechargeable zinc cell which go some way towards achieving this desideratum, or to at least provide the public with a useful choice.

SUMMARY OF THE INVENTION

Accordingly, in a first aspect the present invention provides an active composition for use in preparing a zinc electrode including:
(a) a source of zinc capable of existing in an oxidised and a reduced state; and (b) at least one compound selected from the group consisting of $C_6$-$C_{30}$ fatty acids, salts, esters and other derivatives thereof, and $C_6$-$C_{30}$ alkyl sulfonic acids, salts, esters and other derivatives thereof.

In a second aspect the present invention provides a method of preparing a composition for use in preparing a zinc electrode including the steps of:

Preparing a first precipitate of zinc hydroxide;

Mixing a solution of an alkali salt of either a $C_6$-$C_{30}$ fatty acid or a $C_6$-$C_{30}$ alkyl sulfonic acid with a suspension of the first precipitate; and Adding a solution of a salt of a mineral acid to the mix to provide the composition as a second precipitate;

wherein the composition is a mixture of zinc oxide and/or zinc hydroxide, and an insoluble salt of either a $C_6$-$C_{30}$ fatty acid or a $C_6$-$C_{30}$ alkyl sulfonic acid.

In a third aspect the present invention provides a composition prepared by the method of the second aspect of the invention.

In this specification the term "$C_6$-$C_{30}$ fatty acids" includes saturated, unsaturated and polyunsaturated, naturally occurring and synthetic, fatty acids of 6 to 30 carbon atoms in length. It also includes such fatty acids which may additionally be substituted with one or more substituents, and/or which incorporate aromatic carbocyclic or heterocyclic rings, fused aromatic rings or polycyclic systems including aromatic rings. The aromatic rings may themselves be optionally substituted. Suitable substituents include halogen, amino, nitro, alkyl, alkoxy, carboxyl, hydroxy, amide or ester groups.

The term "$C_6$-$C_{30}$ alkyl sulfonic acids" includes alkyl sulfonic acids 6 to 30 carbon atoms in length. It also includes such alkyl sulfonic acids which may additionally be substituted with one or more substituents, and/or incorporate aromatic carbocyclic or heterocyclic rings, fused aromatic rings or polycyclic systems including aromatic rings. The aromatic rings may themselves be optionally substituted. Suitable substituents include those defined above under the term "$C_6$-$C_{30}$" fatty acids.

The term "derivative" when used in relation to "$C_6$-$C_{30}$ fatty acids" or "$C_6$-$C_{30}$ alkyl sulfonic acids" means any derivative, such as an ester, which is capable of being hydrolysed under alkaline conditions to yield the free fatty acid or alkyl sulfonic acid salt.

While component (b) may be a single compound selected from the group consisting of $C_6$-$C_{30}$ fatty acids, salts, esters and other derivatives thereof, and $C_6$-$C_{30}$ alkyl sulfonic acids, salts, esters and other derivatives thereof, embodiments in which component (b) includes two or more of these compounds are also contemplated.

Preferably, component (b) comprises a $C_6$-$C_{30}$ fatty acid, salt, or ester thereof.

More preferably, the fatty acid, salt or ester thereof is a naturally occurring $C_{12}$-$C_{22}$, still more preferably $C_{16}$-$C_{20}$, fatty acid, salt or ester.

Yet more preferably, the fatty acid, salt or ester thereof is stearic acid, or a salt or ester thereof.

Preferably, the active composition comprises components (a) and (b) in admixture.

In preferred embodiments, the active composition comprises a mixture of a salt of stearic acid and one or both of zinc oxide and zinc hydroxide.

In one preferred embodiment, the active composition comprises zinc stearate and one or both of zinc oxide and zinc hydroxide. In this embodiment, preferably the zinc stearate:zinc oxide/hydroxide molar ratio is in the range 0.0001:1 to 0.5:1, more preferably 0.05:1 to 0.4:1, and still more preferably from 0.075:1 to 0.25:1.

In another preferred embodiment, the active composition comprises calcium stearate and one or both of zinc oxide and zinc hydroxide. In this embodiment, preferably the calcium stearate:zinc oxide/hydroxide molar ratio is in the range of 0.0001:1 to 0.2:1, more preferably 0.01:1 to 0.2:1, and still more preferably 0.03:1 to 0.15:1.

In other preferred embodiments, the active composition comprises magnesium stearate, strontium stearate or barium stearate and one or both of zinc oxide and zinc hydroxide. In this embodiment, preferably the magnesium, strontium or barium stearate:zinc oxide/hydroxide molar ratio is in the range 0.0001:1 to 0.2:1, more preferably 0.01:1 to 0.2:1, and still more preferably 0.03:1 to 0.15:1.

In yet another preferred embodiment, the active composition comprises iron (II) stearate, iron (III) stearate or aluminium stearate and one or both of zinc oxide and zinc hydroxide. In this embodiment, preferably the iron (II), iron (III) or aluminium stearate:zinc oxide/hydroxide molar ratio is in the range 0.0001:1 to 0.2:1, more preferably 0.01:1 to 0.2:1, and still more preferably 0.05:1 to 0.15:1.

Optionally, the active composition also includes graphite powder. When included, the graphite powder preferably comprises 0.1 to 60%, more preferably 10 to 45%, and still more preferably 15 to 35%, by weight of the active composition.

Optionally, the active composition also includes a lead (II) salt, for example $Pb(NO_3)_2$. When the lead (II) salt is included, preferably the lead (II):zinc molar ratio is in the range 0.0005:1 to 0.1:1.

Optionally, the active composition also includes a copper (II) salt, for example $Cu(NO_3)_2$. When the copper (II) salt is included, preferably the copper (II):zinc molar ratio is in the range 0.0005:1 to 0.1:1.

In a fourth aspect the present invention provides an electrode comprising a composition of the first or third aspect of the invention.

Preferably, the zinc electrode comprises the active composition applied to a current collector.

In a fifth aspect the present invention provides a composition prepared from an electrode of the fourth aspect of the invention wherein the electrode has been charged.

In a sixth aspect the present invention provides a method of preparing an electrode including the steps of:

Mixing solid alkali metal hydroxide with a composition of the first or third aspect of the invention;

Applying the mix on to a current collector; and

Forming the electrode.

In a seventh aspect the present invention provides a cell comprising at least one electrode of the fourth aspect of the invention.

Preferably the cell comprises a non-conventional separator wherein the separator is porous. More preferably the separator is a woven cloth. Most preferably the separator is woven nylon cloth.

In one embodiment the cell excludes the use of a conventional separator.

Preferably the cell comprises an electrolyte saturated with zinc oxide. More preferably the electrolyte is super-saturated with zinc oxide.

Preferably the cell is a rechargeable cell.

Preferably, the zinc electrode is such that the cell, after at least 350 charge/discharge cycles, at charge and discharge rates such that charge and discharge of the battery are complete within 2-2.5 hours and 1-1.5 hours respectively, maintains at least 55% of the initial capacity of the cell.

Preferably, the zinc electrode is such that the cell, after at least 1134 charge/discharge cycles, at charge and discharge rates such that charge and discharge of the battery are complete within 2 hours and 1.7 hours respectively, maintains at least 80% of the initial capacity of the cell.

While the invention is broadly as defined above, it is not limited thereto and also includes embodiments of which the following description provides examples.

DESCRIPTION OF THE DRAWINGS

The present invention will now be described in more detail and with reference to the accompanying drawings, in which.

DETAILED DESCRIPTION OF THE INVENTION

As defined above, the present invention relates to new zinc electrodes, and to rechargeable zinc cells containing such electrodes.

The applicants have surprisingly found that a significant improvement in the performance of zinc cells has been achieved. This improvement is attributed to a lowering of the shape change in a zinc electrode and the amount of dendrite growth can be achieved by incorporating a fatty acid, or a salt, ester or other derivative thereof into the active composition of the zinc electrode.

Additional advantages accrue from a lowering of the amount of dendrite growth. These advantages include the ability to construct certain cells, e.g. Ni—Zn cells, in which the use of a conventional separator is not essential.

"Conventional separators" for use in alkaline cells are a permeable or semipermeable membrane that is located between the electrodes. The separator provides a physical barrier to dendrite growth. However, the separator must also be permeable to ions in the electrolyte.

Conventional separators such as Celgard™ are a membrane of polypropylene. Cellulose-based membranes have also been used as separators. These include cellophane and sausage casing material.

The use of conventional separators such as Celgard™ is problematic. The product is relatively costly. Cellulose-based separators are unstable in alkaline electrolytes.

Further disadvantages of conventional separators include the thickness of the membrane differing between dry and wet states. This may result in the cell rupturing as the wetted membrane thickens.

Conventional separators also place a limit on the rate of ion flow between the separated electrolyte containing compartments. This limitation has a bearing on the maximum current and discharge rate obtainable from alkaline cells constructed using a conventional separator.

It has been demonstrated by the inventors that a porous separator such as woven nylon cloth may be used in the construction of cells comprising the zinc electrodes of the invention.

It is contemplated that in the construction of cells according to the invention the requirement for a separator could be eliminated altogether. However, it is recognised that in the manufacture of cells it may often be desirable to use a separator such as woven nylon cloth, if only to act as a spacer to ensure physical separation of the electrodes.

Materials suitable for use as a separator (or spacer) as contemplated by the inventors include any material that is physically stable (and preferably chemically stable) in the electrolyte under the conditions of use of the cell for the lifetime of the cell.

The material of the separator is of a porous form and may be either woven or unwoven e.g. matted, sintered or fused fibres. Suitable materials include, but are not limited to, polyamides (such as nylon) and polyalkenes (such as polyethylene and polypropylene).

In a preferred embodiment a cell constructed using a non-conventional separator as described above and comprising a zinc electrode may provide a cell with high discharge rates.

In particular, in preferred embodiments of the invention the active zinc-containing material of the zinc electrode, after at least 350 charge/discharge cycles, at high charge discharge rates has been found to maintain sufficient electroactive surface area on the electrode to provide at least 55% of the initial capacity of the electrode.

In other preferred embodiments of the invention the active zinc-containing material of the zinc electrode, after at least 1134 charge/discharge cycles at high charge/discharge rates, has been found to maintain sufficient electroactive surface area on the electrode to provide at least 80% of the initial capacity of the electrode.

Furthermore, there is no discernible relocation of the zinc active composition within the cell, either on the separators or the walls of the container.

The rechargeable zinc electrodes of the invention therefore contain an active composition comprising at least:

(a) a source of zinc capable of being repeatedly cycled between an oxidised and a reduced state; and (c) at least one compound selected from the group consisting of $C_6$-$C_{30}$ fatty acids, salts, esters and other derivatives thereof, and $C_6$-$C_{30}$ alkyl sulfonic acids, salts, esters and other derivatives thereof (as defined above).

In preferred embodiments of the invention, the component (b) of the active composition comprises a naturally occurring $C_{12}$-$C_{22}$ fatty acid, or a salt or ester thereof. It is preferred that component (b) is a $C_{16}$-$C_{20}$ fatty acid, salt or ester, with a particularly preferred fatty acid being stearic acid, or a salt or ester thereof.

It will be appreciated that the source of zinc can be any electrochemically active form of zinc capable of being repeatedly cycled between an oxidised and reduced state (containing zinc metal in the charged state). It is however generally preferred that the source of zinc be provided by a zinc salt (such as zinc sulphate or zinc nitrate), or by zinc oxide and/or hydroxide. In these embodiments of the invention, it is preferred that the active composition comprises a mixture of the source of zinc and the fatty acid, salt or ester.

The active composition may be formed as an intimate mixture, by precipitation of a zinc salt of a fatty acid and zinc hydroxide by rapid mixing of an alkaline mixture of the fatty acid, and the zinc salt (for example zinc sulphate or zinc nitrate). Species such as the salt zinc mono stearate monohydroxide may also form in this preparation and further enhance the battery performance. In alternative embodiments; the active composition may be prepared simply by mixing the two components (a) and (b) as solid materials after separate preparation.

In further alternative embodiments, the active composition may be formed by adding other salts of a fatty acid, such as a potassium, sodium or lithium salt, to zinc hydroxide or zinc oxide, so that a zinc fatty acid salt forms on subsequent charge/discharge cycling.

The active composition may also be formed as an intimate mixture by the precipitation of a calcium salt of a fatty acid and zinc hydroxide by rapid mixing of an alkaline mixture of the fatty acid, a calcium salt (for example calcium sulphate or calcium nitrate) and a zinc salt. Species such as the salt calcium mono stearate monohydroxide may also form in this preparation and further enhance the battery performance.

In alternative embodiments, the active composition may be formed by adding other salts of a fatty acid, such as a potassium sodium or lithium salt, to zinc hydroxide or zinc oxide, together with a calcium salt, so that a calcium fatty acid salt forms on subsequent charge/discharge cycling.

In further alternative embodiments, the active composition may be formed by adding other salts of a fatty acid, such as a potassium, sodium or lithium salt, to zinc hydroxide or zinc oxide, together with a magnesium, strontium or barium salt, so that a magnesium, strontium or barium fatty acid salt forms on subsequent charge/discharge cycling.

In one preferred embodiment, the active composition comprises a mixture of zinc oxide and/or zinc hydroxide with zinc stearate. Such a mixture may conveniently be prepared by adding an alkali to stearic acid, and then adding zinc sulfate or zinc nitrate.

In another preferred embodiment, the active composition comprises a mixture of zinc oxide and/or zinc hydroxide with calcium stearate. Such a mixture can conveniently be prepared by precipitation from an alkaline stearate solution containing a zinc salt and a calcium (II) salt such as calcium nitrate.

In further preferred embodiments, the active composition comprises a mixture of zinc oxide and/or zinc hydroxide with magnesium stearate, strontium stearate or barium stearate. Such a mixture may conveniently be prepared by precipitation from an alkaline stearate solution containing a zinc salt and a magnesium (II), strontium (II) or barium (II) salt.

In other preferred embodiments, the active composition comprises a mixture of zinc oxide and/or zinc hydroxide with iron (II) stearate, iron (III) stearate or aluminium stearate. Such a mixture may conveniently be prepared by precipitation from an alkaline stearate solution containing a zinc salt and an iron (II), iron (III) or aluminium (III) salt.

In further preferred embodiments, the active composition comprises a mixture of zinc oxide and/or zinc hydroxide with lead stearate, tin stearate or cadmium stearate. Such a mixture may conveniently be prepared by precipitation from an alkaline stearate solution containing a zinc salt and a lead, tin or cadmium salt.

In still further embodiments, an active composition may be prepared by pasting the zinc source and a source of calcium, magnesium, strontium, barium, iron (II), iron (III), aluminium, lead, tin or cadmium onto a suitable current collector and then spraying, dipping or coating with a fatty acid ester solution, solid or melt. The active composition may also be prepared by pressing together sintered zinc powder with a fatty acid ester together with a source of calcium, magnesium, strontium, barium, iron (II), iron (III), aluminium, lead, tin or cadmium to form an anode.

In addition to the source of zinc and the fatty acid or salt, ester or other derivative thereof or the alkyl sulfonic acid or salt, ester or other derivative thereof, the active composition of the zinc electrode may optionally include lead (II) salts, for example $Pb(NO_3)_2$. When lead (II) salts are included, preferably the lead (II):zinc molar ratio is in the range 0.0005:1 to 0.1:1. The addition of lead salts may decrease the rate of hydrogen evolution at the anode during recharge.

In addition to the source of zinc and the fatty acid or salt, ester or other derivative thereof or the alkyl sulfonic acid or salt, ester or other derivative thereof, the active composition of the zinc electrode may optionally include copper (II) salts, for example $Cu(NO_3)_2$. When copper (II) salts are included, preferably the copper (II):zinc molar ratio is in the range 0.0005:1 to 0.1:1.

Optionally, the active composition also includes graphite powder. When included, the graphite powder preferably comprises 0.1 to 60%, more preferably 10 to 45%, and still more preferably 15 to 35%, by weight of the active composition. The addition of graphite may decrease the electrical resistance of the active composition.

The zinc electrodes of the invention will also normally include a current collector. Thus, the electrodes may be prepared by pasting the active composition onto a suitable current collector, for example graphite cloth, slotted copper foil or woven brass mesh. Alternatively, the active mass could be spread on a suitable support and electrochemically or otherwise reduced to give a network of zinc metal as the current collector. Advantageously solid alkali metal hydroxide (base), such as potassium hydroxide, is mixed with the active composition.

In another aspect, the present invention provides a rechargeable zinc cell containing, as anode, a zinc electrode of the invention. Rechargeable zinc cells containing a zinc electrode of the invention can include nickel/zinc cells (containing a nickel electrode as NiOOH in the charged states); zinc/air cells; silver/zinc cells (containing a silver electrode as silver oxide in the charged state); and manganese/zinc cells (containing a manganese electrode as manganese dioxide in the charged state). The rechargeable zinc cells of the invention may be prepared by incorporating the electrodes with a suitable electrolyte, electrode connectors and separators, using methods well known in the art.

In one embodiment, the electrolyte is an aqueous solution of a suitable base. Suitable bases include, but are not limited to potassium hydroxide, sodium hydroxide and lithium hydroxide and mixtures thereof. In a preferred embodiment the electrolyte is an aqueous solution of potassium hydroxide.

Preferably the electrolyte is an aqueous solution of 7M potassium hydroxide [KOH].

In one embodiment, the electrolyte is saturated with zinc oxide. In a preferred embodiment the electrolyte is super-saturated with zinc oxide.

In this context "super-saturated" is intended to mean a stable solution containing a concentration of zinc oxide greater than that obtained by conventional methods. Conventional methods involve the addition of an excess of zinc oxide to an aqueous solution of concentrated alkali metal hydroxide. These methods typically provide an electrolyte saturated with zinc oxide up to a concentration of about 47 g/L at 27° C.

It is anticipated that a reduction in self-discharge of charged zinc electrodes may be obtained by use of a super-saturated electrolyte. Additional improvements in the performance of the cell would thereby be obtained.

In one embodiment, the electrolyte is saturated with a suitable tetraalkylammonium salt, such as a tetrabutylammonium salt. In a preferred embodiment, the tetraalkylammonium salt is tetrabutylammonium hydroxide.

In a preferred embodiment the electrolyte is an aqueous solution of potassium hydroxide saturated with both zinc oxide and tetrabutylammonium hydroxide.

In one embodiment, the accessibility of the electrolyte to the electrode active mass is restricted, for example by enclosing the electrode assembly in a suitable material which is stable in the electrolyte medium. Suitable materials include a range of inert plastics such as polyethylene but are not limited thereto.

The rechargeable cells of the invention may be operated in either a sealed or unsealed mode. It is preferred that the cell is operated in a sealed mode to permit oxygen generated within the cell to react with zinc, to further inhibit the formation of dendrites. If operated in the unsealed mode, it may be preferable to introduce a one-way valve to permit venting of the cell whilst preventing ingress of air to control the carbonate level in the cell.

The invention will now be described in more detail with reference to the accompanying drawings and the following non-limiting examples.

Example 1

Figure 1:
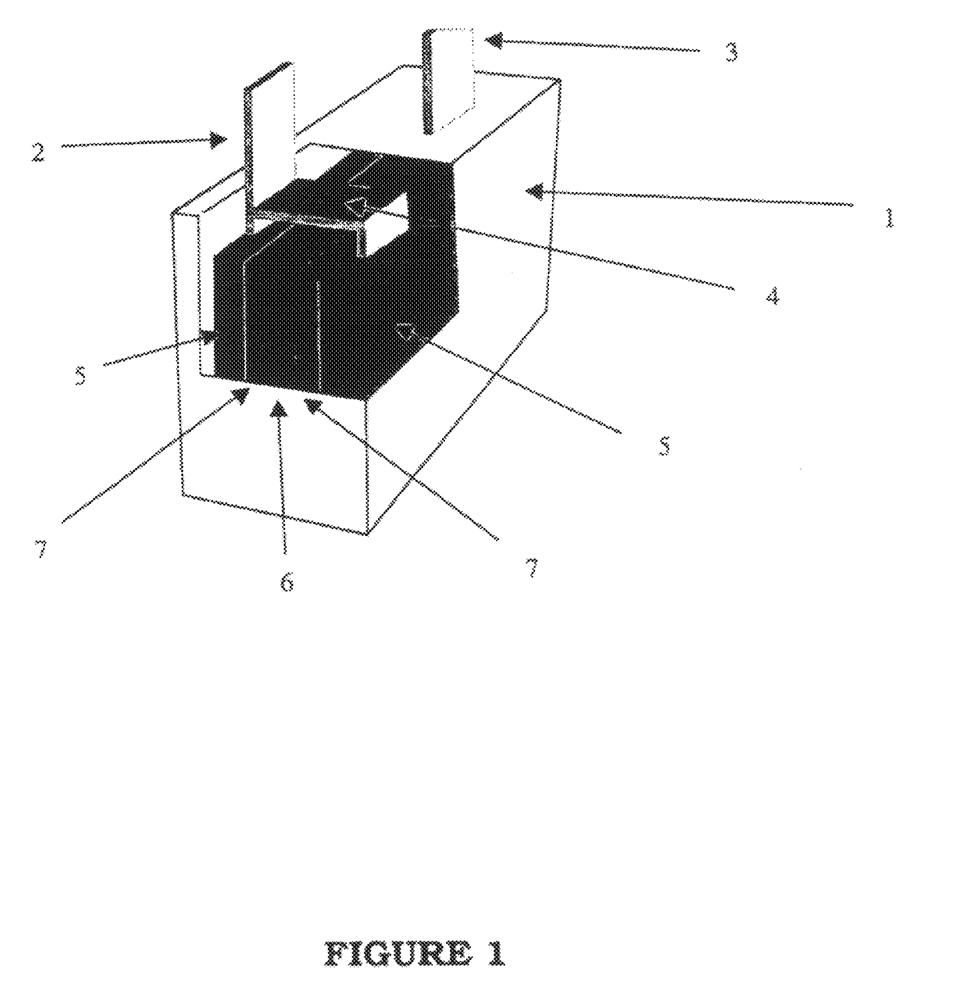
FIG. 1 is a schematic diagram of a rechargeable zinc cell of the present invention.

A cell was constructed of approximately AA size with two zinc electrodes and one nickel electrode as shown in FIG. 1. The electrodes had dimensions 38 mm×70 mm×1 mm. The nickel electrode was sandwiched between the two zinc electrodes and separated with woven nylon separators and the electrode assembly enclosed in nylon cloth. The electrode assembly was mounted in a planar manner within a cell container.

The nickel electrode was obtained from an AA-sized nickel cadmium battery produced by JJJ Battery Co. Ltd., Jiangmen, Guangdong Province, P. R. China and was used without further modification.

The zinc electrodes were prepared from an active composition containing a zinc stearate:zinc hydroxide molar ratio of 0.163:1 mixed with carbon powder (30% by weight in the final mixture). The active mass was prepared as an intimate mixture by two sequential precipitation processes. In the first precipitation process, zinc sulfate (0.1 mol) was dissolved in water (400 mL) and the solution heated to 50-60° C. Aqueous sodium hydroxide was prepared as a separate solution (0.2 mol sodium hydroxide in 200 mL). Graphite (8.68 g) was dispersed in the sodium hydroxide solution and the sodium hydroxide/graphite suspension was added slowly with stirring to the zinc sulfate solution. A gray suspension of intimately mixed zinc hydroxide and graphite particulates was formed. The pH was adjusted to pH 8-9.

An aqueous potassium stearate solution (500 mL) at 50-60° C. prepared from a stoichiometric mixture of stearic acid (0.0326 mol) and potassium hydroxide (0.0326 mol) was added slowly with stirring to the zinc hydroxide-graphite suspension at 50-60° C. The pH of this mixture was adjusted to 8-9. The mixture was stirred for 5-10 minutes to ensure thorough mixing of potassium stearate with the zinc hydroxide and graphite particles.

In the second precipitation process, a solution of zinc sulfate (0.0163 mol) dissolved in water (100 mL) was added to the mixture of potassium stearate, zinc hydroxide and graphite. This resulted in immediate precipitation of zinc stearate and gave the zinc active mass as a gray precipitate where the zinc stearate, zinc hydroxide and graphite were present as an intimate mixture. This final precipitated mixture was heated to 70° C. and stirred for a further 10 minutes. Upon cessation of stirring, the active mass mixture settled as a uniformly gray material with no stratification consistent with a homogenous mass. After cooling to room temperature, this active mass was filtered and washed with water. The active mass was used immediately without drying.

The active composition was physically supported on the current collector by inclusion of non-woven polyester cloth. The current collector was woven graphite cloth electrochemically plated with metallic tin from an alkaline sodium stannate solution (2 A for 2 min). External electrical contact was made by crimping nickel foil onto the graphite cloth.

The zinc active mass was pasted onto the current collectors so that each zinc electrode contained 0.040 mol of zinc hydroxide.

The electrolyte was 7 M KOH saturated with tetrabutylammonium hydroxide and saturated with ZnO.

In the schematic diagram of the cell shown in FIG. 1, the cell includes a battery case 1, negative electrode connector 2, positive electrode connector 3, negative plate internal connecting strap 4, negative electrode plate 5, positive electrode plate 6 and separators 7.

The cell was cycled through charge and discharge modes. Charging was maintained at a current of 200 mA for 2 hours, with the exception of cycle numbers 31 to 179 where charging was maintained at 200 mA for 2.25 hours. Discharge was through a constant load of 4.9Ω until the cell voltage dropped to 1 V, indicating full discharge of the cell.

Discharge current was calculated by the cell voltage divided by the constant resistance load. Discharge capacity was calculated by integration of the discharge current as a function of time over the discharge period.

Figure 2:
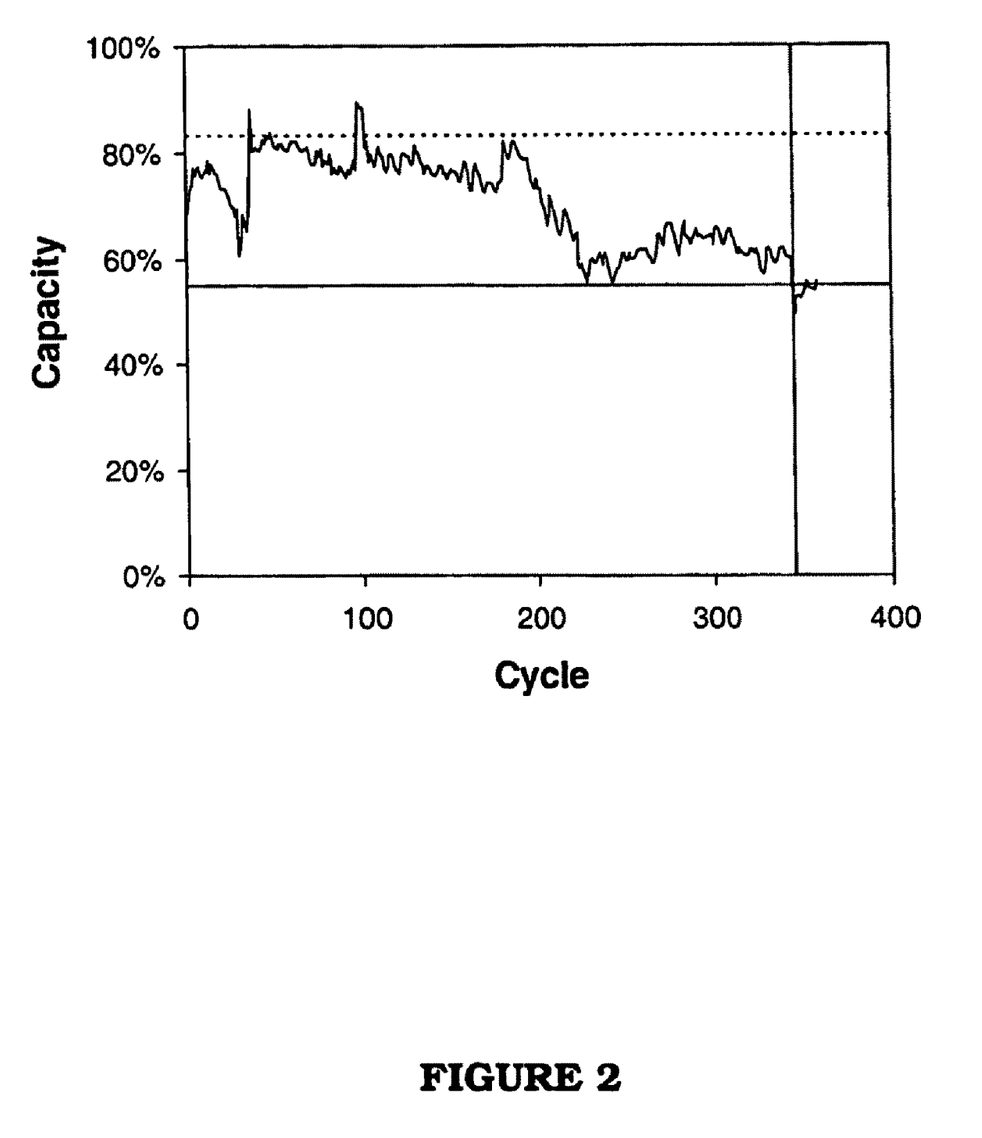
FIG. 2 shows the battery capacity of a rechargeable zinc cell of the invention, as a function of cycle number for discharge/charge cycling. Crosshairs indicate 55% theoretical battery capacity at 355 cycles. The dashed line shows the initial maximum capacity of 83% at 49 cycles (ignoring brief excursions above this value at cycles 37 and 98-102)

The discharge capacity as a function of the number of cycles is shown in FIG. 2. It will be noted that the cell initially exhibited a maximum capacity retention of 83% at 49 cycles (ignoring brief excursions above this value at cycles 37 and 98-102) and still had an average of 55% discharge capacity at 350 cycles. This represents some shape change resulting in the effective, loss of discharge capacity of 34% compared to the initial maximum capacity retention.

Prior art cells with zinc active masses formed from either ZnO or $Zn(OH)_2$ and with otherwise identical construction and electrolyte composition fail due to dendrite growth within 30 cycles under these charge/discharge conditions. Furthermore, gross shape change is evident with relocation and redistribution of zinc active mass throughout the electrochemical cell. No gross shape change was evident in this electrochemical cell.

Example 2

A 1.0 ampere hour cell was constructed of two zinc electrodes and one nickel electrode as shown in FIG. 1. The zinc electrodes had dimensions 92 mm (width)×64 mm (height)×2 mm (thickness) and the nickel electrode had dimensions 87 mm (width)×59 mm (height)×2 mm (width). The nickel electrode was sandwiched between the two zinc electrodes. The electrode assembly was mounted in a planar manner within a cell container.

The nickel electrode was prepared by pasting a mixture of nickel (II) hydroxide, graphite and cobalt (U) sulfate onto a metallic sponge nickel current collector. An external nickel foil conducting terminal was spot welded onto the sponge nickel. The active mass was prepared by thorough dry mixing of nickel (II) hydroxide (0.2 mol) and graphite (6 g) followed by the addition of water (20 mL) and cobalt (H) sulfate (0.02 mol) followed by further mixing. Finally, potassium hydroxide (0.04 mol) was added to this slurry with mixing and excess water removed by suction. Sufficient paste was applied to the current collector so that 0.12 mol of nickel (II) hydroxide was present on the nickel electrode.

The zinc electrodes were prepared from an active composition containing a calcium stearate:zinc hydroxide molar ratio of 0.0527:1 mixed with carbon powder (19% by weight in the final active mass). The active mass was prepared as an intimate mixture by the two sequential precipitation processes described in Example 1. Conditions were identical to that described in Example 1 with the following alterations: In the first precipitation process for Example 2, a suspension of graphite (3 g) and zinc hydroxide (0.1 mol) was prepared and then mixed with potassium stearate (0.01054 mol). In the second precipitation process, an aqueous solution of calcium nitrate ($5.27 \times 10^{-3}$ mol) was added to the suspension of graphite and zinc hydroxide to precipitate the active mass as an intimate mixture of calcium stearate, zinc hydroxide and graphite.

Solid potassium hydroxide (0.3 g) was intimately mixed (by grinding) with the active mass to facilitate the pasting of the active mass onto the current collectors.

The zinc electrode current collectors were assembled by spot welding together three layers of 40×40 brass mesh. External electrical contacts were made by spot welding nickel foil onto the brass mesh. The nickel foil was coated with epoxy resin glue to prevent exposure to the electrolyte.

Sufficient paste was prepared so that each zinc electrode contained active mass equivalent to 0.1 mol of zinc hydroxide.

Each nickel and zinc electrode was individually enclosed with two layers of woven nylon cloth heat sealed at the bottom, side and top edges (with the exception of a small opening for the protrusion of the nickel foil electrical contact). The enclosed nickel electrode was placed between the two enclosed zinc electrodes, which were then wound with nylon thread to ensure the edges of the electrodes remained in close contact. The wound electrode assembly was then enclosed with a shrink-wrapped polyethylene film sealed at the bottom and side edges but open along the top edge. Two layers of 60×60 nylon mesh were placed on the outer face of one side of the electrode assembly to ensure an even pressure across the electrode assembly when the Perspex case was assembled under pressure. The cell was orientated in the vertical configuration.

The electrolyte was 7 M KOH saturated with tetrabutylammonium hydroxide and saturated with ZnO.

In the schematic diagram of the cell shown in FIG. 1, the cell includes a battery case 1, negative electrode connector 2, positive electrode connector 3, negative plate internal connecting strap 4, negative electrode plate 5, positive electrode plate 6 and separators 7. The close-fitting polyethylene bag is not shown.

The cell was subjected to two formation cycles each consisting of charging at 160 mA for 10 hours, 5 minutes at open circuit, discharging at 160 mA until the cell voltage dropped to 1.3 V, followed by 5 minutes at open circuit.

The cell was then cycled through charge and discharge modes. Charging was maintained at a current of 500 mA for 2 hours. Upon completion of charge the cell was held at open circuit for 5 minutes. Discharge was maintained at a constant current of 600 mA until the cell voltage dropped to 1.3 V, indicating full discharge of the cell. Upon completion of discharge the cell was held at open circuit for 5 minutes.

Figure 3:
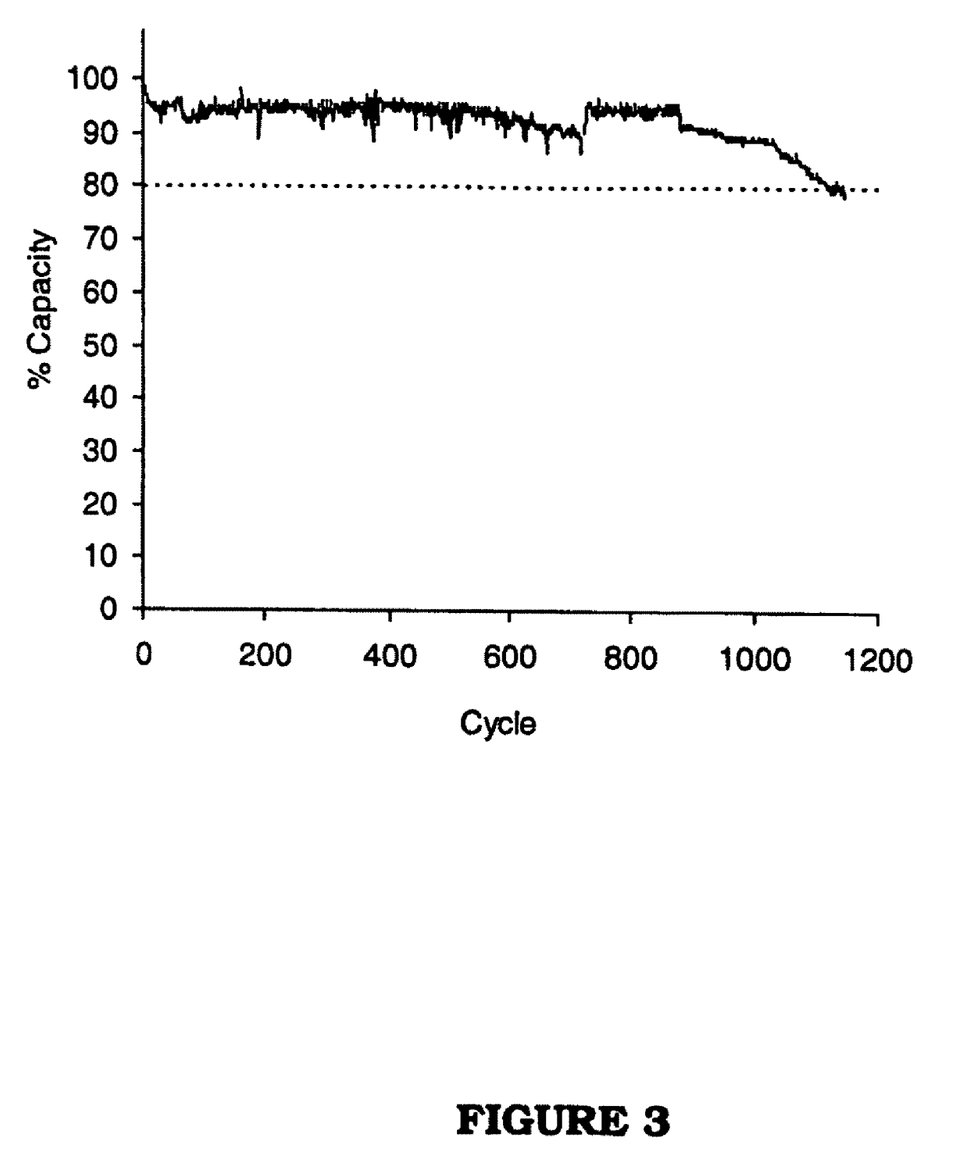
FIG. 3 shows the battery capacity of another rechargeable zinc cell of the invention, as a function of cycle number for discharge/charge cycling. The dashed line shows 80% of the theoretical capacity. The measured discharge capacity remains above this 80% capacity for in excess of 1134 charge/discharge cycles.

The discharge capacity as a function of the number of cycles is shown in FIG. 3. It will be noted that the cell containing the novel zinc active mass maintained a discharge capacity in excess of 80% for 1134 cycles. During the first 500 cycles the capacity was maintained at better than 95% with small cycle-to-cycle variation.

From the $500^{th}$ to $700^{th}$ cycles there is a gradual decline from 95% capacity to 89% capacity. This demonstrates that the modified zinc electrode embodied in this patent does not suffer from significant shape change or dendrite growth.

No gross shape change was evident in the electrochemical cell.

Furthermore, the small decline in capacity over the first 700 cycles evident in the cell containing the novel zinc active mass can be recovered by controlled and deliberate external electrical shorting of the cell for a period of time. In this way, after 720 complete charge/discharge cycles (i.e. terminating on the 5 minute post-discharge open circuit period) of the cell containing the novel zinc active mass, the cell was electrically discharged with an external conducting wire for a period of 24 hours. Following this, and after 3 normal charge/discharge cycles (not shown in FIG. 2), the cell had recovered to 90% capacity. This improvement in capacity continued with cycling so that after a further 10 cycles (cycle 731), the cell capacity returned to the 95% capacity shown over the first 500 cycles. This post-shorting recovery was maintained for a further 140 cycles with little cycle-to-cycle variation in capacity. After cycle 875 a progressive decline in capacity was observed so that by completion of 1027 cycles the capacity was 88% and in excess of the 80% capacity required for satisfactory performance. Upon completion of cycle 1134 the capacity had declined to the 80% capacity criteria.

It is assumed that use of the combination of zinc stearate and zinc hydroxide or of calcium stearate and zinc hydroxide in the active mass decreases the solubility of the zinc electrode discharge products without significantly lowering the discharge or charge rate. Without wishing to be bound by any theory, it is believed that this decrease in the solubility of the zinc electrode discharge products decreases the susceptibility of the zinc electrode to shape change and dendrite formation.

Example 3

An electrolyte of 7M KOH saturated with ZnO can be prepared as an electrolyte that is super-saturated with ZnO by the following method. The zinc content of each solution was determined using atomic absorption spectroscopy (AAS).

Excess solid ZnO powder was stirred in 30 wt % of KOH solution in 200 ml covered plastic beakers for 24 hours one maintained at 27° C. and one at 97° C. The resulting solution was filtered and the solubility of ZnO determined by AAS. At 27° C. the solubility of ZnO was found to be 47.0 g/L. At 97° C. the solubility of ZnO was found to be 36.6 g/L.

Excess zinc powder in contact with sponge nickel (JJJ Battery Co. Ltd., Jiangmen. Guangdong Province, P. R. China) was added to the filtered solutions of ZnO. The mixtures were then stirred at their original incubation temperature for 24 hours until a white coating was observed on the surface of the zinc powder and the evolution of hydrogen ceased.

The concentration of ZnO in each solution was determined by AAS. With respect to ZnO a concentration of 60.0 g/L was obtained at 27° C. and a concentration of 54.7 g/L was obtained at 97° C. The solutions are considered to be super-saturated with respect to ZnO.

Although the invention has been described with reference to particular embodiments, those persons skilled in the art will appreciate that variations and modifications may be made without departing from the scope of the invention.

INDUSTRIAL APPLICATION

It will be appreciated from the discussion above that the present invention provides a zinc electrode for use in a rechargeable electrochemical cell.

Advantageously, rechargeable electrochemical cells incorporating the electrodes of the invention may be repeatedly charged and discharged without rapid failure due to shape change or dendrite formation. The electrochemical cells may be used in portable devices or in fixed energy storage applications.

REFERENCES

[1] J. Jindra, *J. Power Sources,* 66 (1997) 15.
[2] E. Frackowiak, *Power Sources,* 13 (1991) 225.
[3] R Jain, T. C. Adler, F. R. McLarnon and E. J. Cairns, *J. Appl. Electrochem.,* 22 (1992) 1039.
[4] A. Renuka, A. Veluchamy, N. Venkatakrishan, S. S. Begun, V. R. Chidambaram and R Sabapathi, *J. Appl. Electrochem.,* 22 (1992) 182.
[5] M. Suga, N. Kuroda and S. Akita, Eur. Patent Applic. EP No 578 501 (1994); *Chem. Abstr.,* 120 (1994) 139 222.
[6] T. Onda, K. Okabe, K. Fujii and M. Yamane, Jpn. Patent JP No. 0 428 160 (1992); *Chem. Abstr.,* 117 (1992) 30 534.
[7] S. Furukawa, M. Nogami and M. Tadokoro, Jpn. Patent JP No. 03 122 235 (1991); *Chem. Abstr.,* 115 (1991) 23 6319.
[8] S. Furukawa, M. Nogami and M. Tadokoro, Jpn. Patent JP No. 03 297 057 (1991); *Chem. Abstr.,* 116 (1992) 177 762.
[9] K. Obake, Y. Eguchi, T. Atsuda and K. Fujii, Jpn. Patent JP No. 04 126 356 (1992); *Chem. Abstr.,* 117 (1992) 154 561.
[10] I. F. Danzig, U.S. Pat. No. 4,368,244.
[11] A. Charkey, U.S. Pat. No. 5,556,720.
[12] R Shivkiimar, G. Paruthimal kalaignam and T. Vasudevan, *J. Power Sources.,* 55 (1995) 53.
[13] A. Renuka, A. Veluchamy and N. Venkatakrishnan, *J. Power Sources.,* 34 (1991) 381.
[14] Z. Baohong, Ch. Meng. Xu Dongari and W. Yindong, *Ext Abstr., 46$^{th}$ ISE Meet,* Xiamen, P. R. China, 1995, Vol. 2, Abstr. No. 5-43.
[15] V. V. Bocharov, V. E. Dmitrenko, Yu. M. Volkov, V. V. Berendt, V. D. Sudejchenko, A. E. Frolov, T. V. Balashova, E. A. Ranneva and V. M. Zlobin, USSR Patent SU No. 1 311 553 (1992); *Chem. Abstr.,* 119 (1993) 52 899.
[16] V. V. Bocharov, V. E. Dmitrenko, M. K Ostrovskii, V. V. Berendt, V. D. Sudejchenko, A. E. Frolov, T. V. Balashova, E. A. Ranneva, V. M. Zlabin and N. I. Maznichenko, USSR Patent SU No. 1 457 760 (1992); Chem. Abstr., 118 (1993) 258 137.
[17] T. C. Adler, F. R. McLarnon and E. J. Cairns, U.S. Pat. No. 5,453,336.
[18] T. C. Adler, F. R McLarnon and E. J. Cairns, U.S. Pat. No. 5,4302,475.
[19] Y. Eguchi, K. Fujii, T. Atsuta and K. Okabe, Jpn. Patent JP No. 03 230 480 (1990).
[20] K. Okabe, T. Onda, K. Fujii, M. Yamane, N. Matoba, S. Nakajima, K. Rikihisa and K. Adachi, Jpn. Patent JP No. 07 161 376.
[21] K. Okabe, T. Onda, K. Fujii, M. Yamane, N. Matoba, N. Noriko, S. Nakajima, K. Rikihisa and K. Adachi, Jpn. Patent JP No. 07 161 375.

The disclosures of each of which is incorporated herein by reference.

The invention claimed is:

1. A zinc anode active composition for use in the manufacture of rechargeable cells and batteries comprising in admixture
a salt of a fatty acid and a zinc oxide, zinc hydroxide or a mixture thereof, intimately mixed in a molar ratio in the range 0.03:1 to 0.4:1.

2. The composition as claimed in claim 1 wherein the fatty acid is a $C_6$-$C_{30}$ fatty acid.

3. The composition as claimed in claim 2 wherein the fatty acid is a naturally occurring $C_{12}$-$C_{22}$ fatty acid.

4. The composition as claimed in claim 3 wherein the fatty acid is a naturally occurring $C_{16}$-$C_{20}$ fatty acid.

5. The composition as claimed in claim 4 wherein the fatty acid is a metal salt of stearate.

6. The composition as claimed in claim 5 wherein the fatty acid is zinc stearate.

7. The composition as claimed in claim 6 wherein the molar ratio is in the range 0.05:1.00 to 0.4:1.0.

8. The composition as claimed in claim 7 wherein the range is 0.075:1.000 to 0.25:1.00.

9. The composition as claimed in claim 5 wherein the fatty acid is calcium stearate.

10. The composition as claimed in claim 9 wherein the molar ratio is in the range is 0.03:1.00 to 0.15:1.00.

11. The composition as claimed in claim 1 wherein the admixture is formed by precipitation.

12. A zinc electrode comprising a composition as claimed in claim 1.

13. The zinc electrode as claimed in claim 12 wherein the composition further comprises an alkali metal hydroxide.

14. The zinc electrode as claimed in claim 13 wherein the alkali metal hydroxide is present in an amount no less than 0.3 g per 0.1 mole zinc oxide, zinc hydroxide or a mixture thereof.

15. The zinc electrode as claimed in claim 13 wherein alkali metal hydroxide is potassium hydroxide.

16. The zinc electrode as claimed in claim 12 wherein the electrode is charged.

* * * * *